United States Patent
Wang

(10) Patent No.: US 9,609,241 B2
(45) Date of Patent: *Mar. 28, 2017

(54) IMAGE SENSOR PIXEL ARRAY HAVING OUTPUT RESPONSE CURVE INCLUDING LOGARITHMIC PATTERN FOR IMAGE SENSOR BASED TERMINAL

(71) Applicant: Hand Held Products, Inc., Fort Mill, SC (US)

(72) Inventor: Ynjiun P. Wang, Cupertino, CA (US)

(73) Assignee: Hand Held Products, Inc., Fort Mill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/934,281

(22) Filed: Nov. 6, 2015

(65) Prior Publication Data

US 2016/0065869 A1    Mar. 3, 2016

Related U.S. Application Data

(63) Continuation of application No. 12/421,476, filed on Apr. 9, 2009, now Pat. No. 9,183,425.

(51) Int. Cl.
*G06K 7/10*   (2006.01)
*H04N 5/355*   (2011.01)
(Continued)

(52) U.S. Cl.
CPC ..... *H04N 5/35518* (2013.01); *G06K 7/10722* (2013.01); *H04N 5/2353* (2013.01);
(Continued)

(58) Field of Classification Search
CPC .......... H04N 5/35518; H04N 5/23212; H04N 9/045; G06K 7/10722
(Continued)

(56) References Cited

U.S. PATENT DOCUMENTS 5,534,915 A   7/1996  Sandrew
6,191,408 B1   2/2001  Shinotsuka et al.
(Continued)

FOREIGN PATENT DOCUMENTS

AU       268429      9/1999
AU     2003231241    11/2003
(Continued)

OTHER PUBLICATIONS

European Patent Office, Communication pursuant to Article 94(3) EPC for European Application No. 10159381.2, dated Sep. 2, 2010 (6 pages).
(Continued)

*Primary Examiner* — Laura Gudorf
(74) *Attorney, Agent, or Firm* — Additon, Higgins & Pendleton, P.A.

(57) ABSTRACT

There is described in one embodiment an indicia reading terminal having an image sensor pixel array incorporated therein, wherein the terminal is operative for decoding of decodable indicia and for providing color frames of image data for storage or transmission. An image sensor based terminal in one embodiment can include an image sensor having a hybrid monochrome and color image sensor pixel array wherein the image sensor pixel array includes a first subset of monochrome pixels and a second subset of color pixels. In one embodiment, an output response curve for the image sensor pixel array can include a logarithmic pattern.

10 Claims, 6 Drawing Sheets

(51) Int. Cl.
*H04N 9/04* (2006.01)
*H04N 5/232* (2006.01)
*H04N 5/235* (2006.01)

(52) U.S. Cl.
CPC ..... *H04N 5/23212* (2013.01); *H04N 5/35527* (2013.01); *H04N 9/045* (2013.01)

(58) Field of Classification Search
USPC .................................................. 235/472.01
See application file for complete search history.

(56) References Cited

U.S. PATENT DOCUMENTS

| | | | |
|---|---|---|---|
| 6,198,514 B1 | 3/2001 | Lee et al. | |
| 6,594,041 B1 | 7/2003 | Canata | |
| 6,697,112 B2* | 2/2004 | Morris | H04N 5/235 257/229 |
| 6,813,041 B1 | 11/2004 | Moroney et al. | |
| 6,822,762 B2 | 11/2004 | Moroney et al. | |
| 7,113,649 B2 | 9/2006 | Gindele | |
| 7,568,628 B2 | 8/2009 | Wang | |
| 7,611,060 B2 | 11/2009 | Wang | |
| 7,909,257 B2 | 3/2011 | Wang | |
| 8,733,660 B2 | 5/2014 | Wang et al. | |
| 2002/0186387 A1 | 12/2002 | Moroney et al. | |
| 2003/0235342 A1 | 12/2003 | Gindele | |
| 2005/0052557 A1* | 3/2005 | Kusaka | H04N 3/155 348/308 |
| 2005/0078194 A1 | 4/2005 | Gonzalez | |
| 2005/0167602 A1 | 8/2005 | Dierickx | |
| 2005/0264683 A1 | 12/2005 | Kamon et al. | |
| 2005/0264684 A1 | 12/2005 | Kamon et al. | |
| 2005/0270412 A1 | 12/2005 | Kamon et al. | |
| 2005/0280868 A1 | 12/2005 | Kamon et al. | |
| 2006/0283952 A1* | 12/2006 | Wang | G06K 7/10722 235/462.01 |
| 2007/0040914 A1 | 2/2007 | Katagiri et al. | |
| 2008/0018766 A1 | 1/2008 | Miyatake | |
| 2008/0251695 A1 | 10/2008 | Kamon | |
| 2010/0044440 A1 | 2/2010 | Wang | |
| 2011/0163166 A1 | 7/2011 | Wang | |
| 2014/0204257 A1 | 7/2014 | Wang et al. | |
| 2014/0246494 A1 | 9/2014 | Wang et al. | |

FOREIGN PATENT DOCUMENTS

| | | |
|---|---|---|
| CN | 101069190 A | 11/2007 |
| EP | 1139284 | 10/2001 |
| EP | 1377029 | 1/2004 |
| EP | 1500046 | 1/2005 |
| JP | 11293799 | 10/1999 |
| JP | 2001313844 | 11/2001 |
| JP | 2002077733 | 3/2002 |
| JP | 2002300746 | 10/2002 |
| JP | 2004030670 | 1/2004 |
| JP | 2005524895 | 8/2005 |
| JP | 2005348005 | 12/2005 |
| JP | 2006014277 | 1/2006 |
| JP | 2006020278 | 1/2006 |
| JP | 2006020279 | 1/2006 |
| JP | 2006050541 | 2/2006 |
| JP | 2007082180 | 3/2007 |
| JP | 2007082181 | 3/2007 |
| WO | WO-9944371 | 9/1999 |
| WO | WO-0031959 | 6/2000 |
| WO | WO-03094112 | 11/2003 |
| WO | WO-2006098954 A2 | 9/2006 |

OTHER PUBLICATIONS

European Patent Office, European Search Report for European Application No. 10159381.2, dated Aug. 9, 2010 (3 pages).
European Patent Office, Communication dated Aug. 9, 2010 including European Search Report dated Jul. 20, 2010 (3 pgs.).
Chinese Office Action with Search Report, Application No. 201010180776.8, Dated Nov. 22, 2013, Translation Provided, 28 Pages.
Chinese Second Office Action, dated Jul. 21, 2014, Patent Application No. 201010180776.8, References have been previously cited, 16 pages.

* cited by examiner

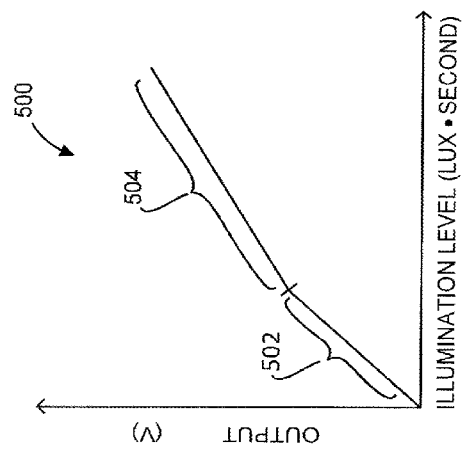
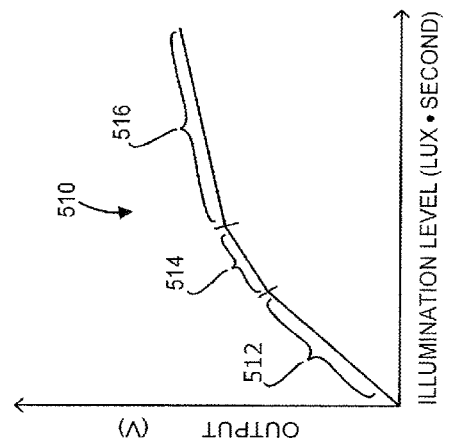
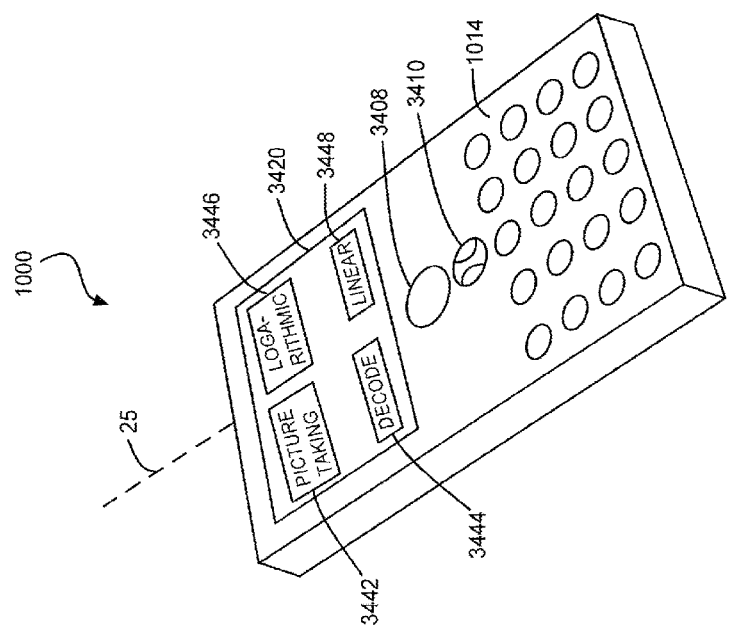

IMAGE SENSOR PIXEL ARRAY HAVING OUTPUT RESPONSE CURVE INCLUDING LOGARITHMIC PATTERN FOR IMAGE SENSOR BASED TERMINAL

CROSS-REFERENCE TO RELATED APPLICATION

The present application claims the benefit of U.S. patent application Ser. No. 12/421,476 for an Image Sensor Pixel Array Having Output Response Curve Including Logarithmic Pattern for Image Sensor Based Terminal filed Apr. 9, 2009 (and published on Oct. 14, 2010 as U.S. Patent Application Publication No. 2010/0258633), now U.S. Pat. No. 9,183,425. Each of the foregoing patent application, patent publication, and patent is hereby incorporated by reference in its entirety.

FIELD OF THE INVENTION

The invention relates to data terminals in general and specifically to image sensor based data terminals.

BACKGROUND OF THE INVENTION

Image sensor based terminals are known to be used in industrial data collection applications. For example, image sensor based indicia reading terminals have been used for a number of years for purposes of decoding encoded information encoded in bar code symbols. For decoding of a bar code symbol, a captured image captured with use of an image sensor based terminal can be captured and subject to processing by application of one or more bar code decoding algorithms. Image sensor based indicia reading terminals are available either with one dimensional image sensors or two dimensional image sensors.

More recently it has become popular to incorporate color image sensors in cellular phones. In commonly available cellular phones, image sensors can be incorporated. Image sensor based cellular phones are operative to capture color frames of image data for storage on board the terminal and/or for wireless transmission to an external terminal.

SUMMARY OF THE INVENTION

There is described in one embodiment an indicia reading terminal having an image sensor pixel array incorporated therein, wherein the terminal is operative for decoding of decodable indicia and for providing color frames of image data for storage or transmission. An image sensor based terminal in one embodiment can include an image sensor having a hybrid monochrome and color image sensor pixel array, wherein the image sensor pixel array includes a first subset of monochrome pixels and a second subset of color pixels. In one embodiment, an image sensor based terminal can include an image sensor pixel array without monochrome pixels including color filters disposed over each pixel such as may be provided by a Bayer pattern filter. In another embodiment, an image sensor based terminal can include a monochrome image sensor pixel array without color filter elements. In one embodiment, an output response curve for the image sensor pixel array can include a logarithmic pattern.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4 is a perspective physical form view of an exemplary image sensor based terminal including a hand held housing;

FIGS. 5-9 are output response curves for an image sensor pixel array in which an output response signal for each pixel of an image sensor pixel array is plotted for a range of illumination levels expressed in terms of lux•second, wherein an increase in either illumination intensity or exposure time increases an illumination level;

DETAILED DESCRIPTION OF INVENTION

Figures 1, 2:
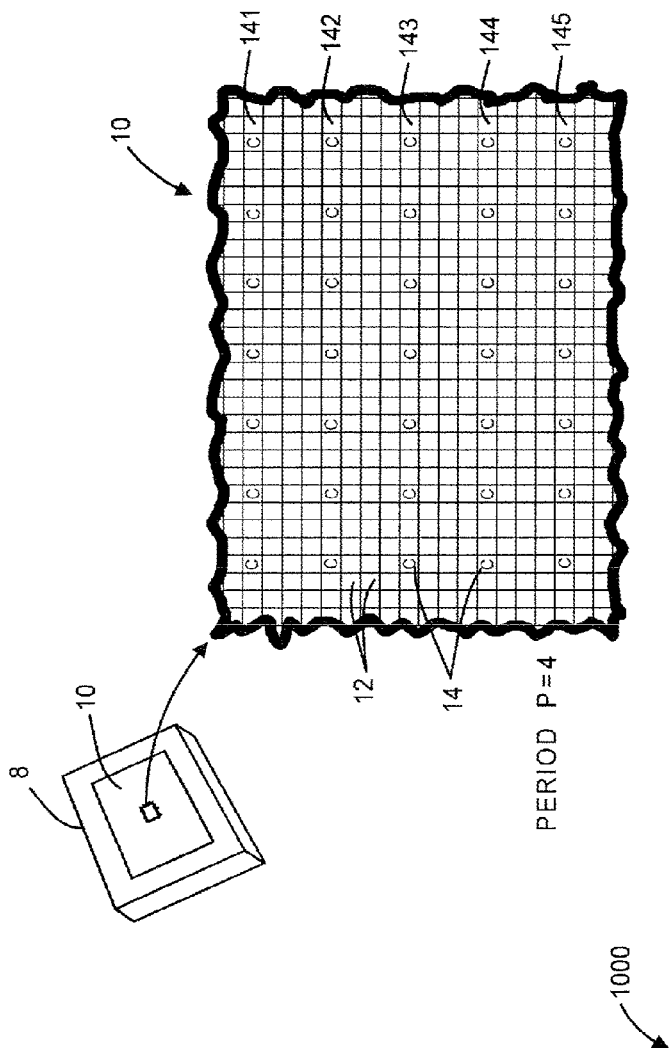
FIG. 1 is a schematic diagram illustrating an image sensor based terminal in one embodiment.
FIG. 2 is a diagram illustrating a hybrid monochrome and color image sensor pixel array having a first subset of monochrome pixels and a second subset of color pixels.

Referring to FIG. 1, an image sensor based terminal 1000 can be provided having a hybrid monochrome and color image sensor pixel array 10, wherein the image sensor pixel array has a first subset of monochrome pixels and a second subset of color pixels. Terminal 1000 can also include an indicia decode module 30 for configuring terminal 1000 to operate in an indicia decode operating mode and a picture taking module 40 for configuring terminal 1000 to operate in a picture taking mode.

Referring to FIG. 2, an image sensor pixel array 10 of an image sensor based terminal 1000 can include pixels arranged in a plurality of rows of pixels and can include a first subset of monochrome pixels 12 devoid of color filter elements and a second subset of color pixels 14 including color filter elements. Such color sensitive pixels can be disposed at spaced apart positions of an image sensor pixel array 10 and can be disposed at positions uniformly or substantially uniformly throughout an image sensor pixel array 10. In one embodiment, the spaced apart color pixels of the image sensor array, though spaced apart can follow a pattern according to a Bayer pattern. For example, where Red=R, Green=G, and Blue=B, the color pixels shown in row 141 can have the pattern . . . GRGRGRG . . . which pattern can be repeated for rows 143 and 145. The pixels of row 142 can have the pattern . . . BGBGBGB . . . , which pattern can be repeated for row 144. The patterns described with reference to rows 141, 142, 143, 144, 145 can be repeated throughout image sensor pixel array 10. A color frame of image data captured with use of a color image sensor pixel array 10 having both color and monochrome pixels can include monochrome pixel image data and color pixel image data. In another embodiment, image sensor pixel array 10 can have color pixels only and can be devoid of monochrome pixels. In another embodiment, image sensor pixel array 10 can include a Bayer pattern filter. In another embodiment, image sensor pixel array 10 can be provided by a monochrome image sensor pixel array without color filter elements. Image sensor 8 can be packaged in an image sensor integrated circuit as shown in FIG. 2. Various additional features that can be utilized with image sensor based terminal 1000, are disclosed in U.S. patent application Ser. No. 11/174,447 entitled, Digital Picture Taking Optical Reader Having Hybrid Monochrome And Color Image Sensor Array, filed Jun. 30, 2005, incorporated herein by reference. Additional features that can be used with image sensor based terminal 1000 are disclosed in U.S. patent application Ser. No. 12/421,457 entitled, Imaging Terminal Having Color Correction, incorporated herein by reference.

Figure 3:
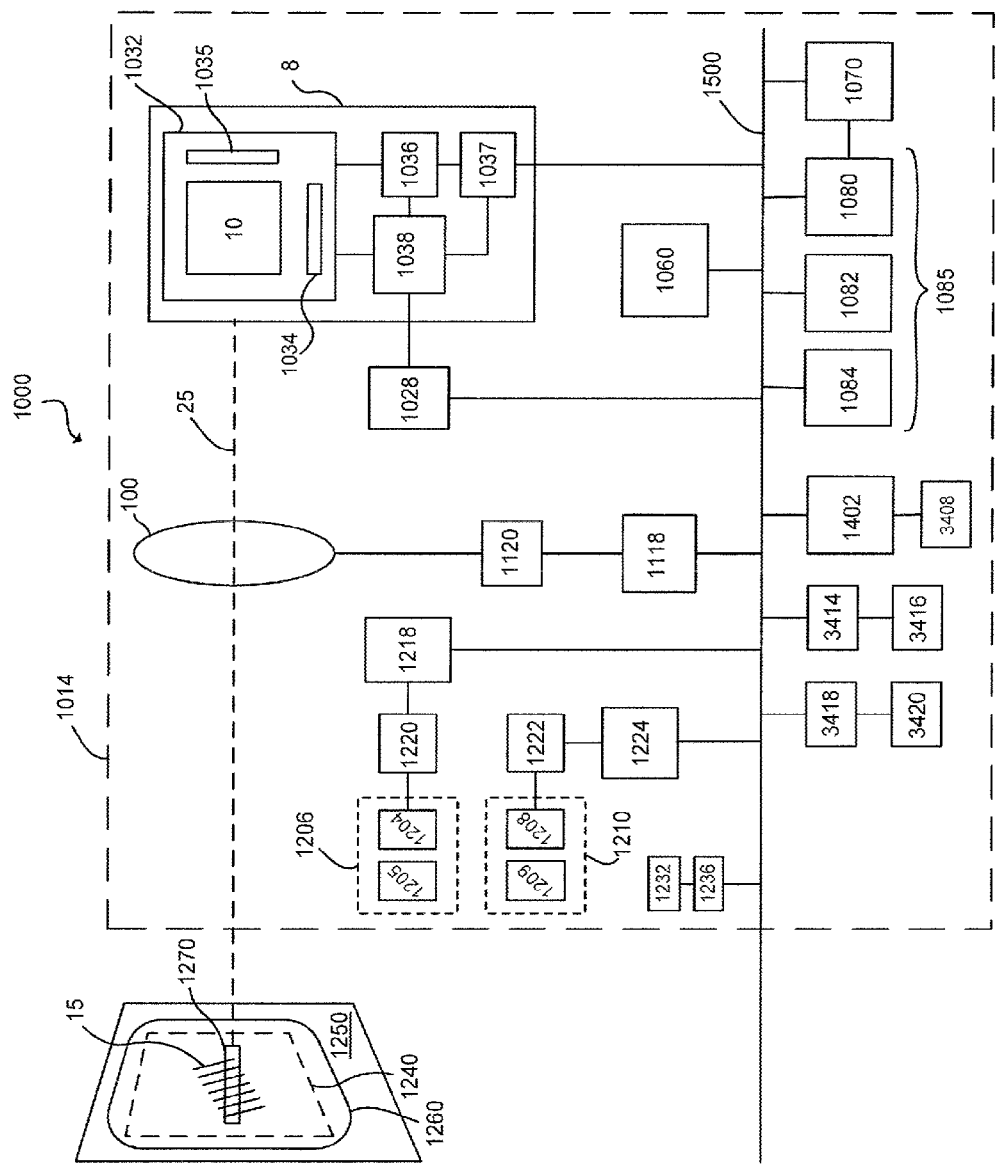
FIG. 3 is a block diagram illustrating an image sensor based terminal.

A block diagram illustrating an exemplary image sensor based terminal 1000 incorporating image sensor 8 is shown in FIG. 3. Image sensor based terminal 1000 can include image sensor 8 having image sensor circuit 1032 comprising a multiple pixel image sensor pixel array 10 having pixels arranged in rows and columns of pixels, associated column circuitry 1034 and row circuitry 1035. Associated with the image sensor circuit 1032 can be amplifier circuit 1036, and an analog to digital converter 1037 which converts image information in the form of analog signals read out of image sensor circuit pixel array 10 into image information in the form of digital signals. Image sensor circuit 1032 can also have an associated timing and control circuit 1038 for use in controlling e.g., the exposure period of image sensor circuit 1032, gain applied to the amplifier circuit 1036. The noted circuit components 1032, 1036, 1037, and 1038 that make up image sensor 8, or a subset of the components 1032, 1036, 1037, 1038 can be packaged into a common image sensor integrated circuit. In one example, image sensor 8 can be provided by monochrome MT9V022 image sensor integrated circuit available from Micron Technology, Inc. modified to include color filters disposed on a subset of pixels of image sensor pixel array 10 to define a hybrid monochrome and color image sensor pixel array as described herein. In another embodiment, image sensor 8 can be provided by monochrome MT9V022 image sensor integrated circuit including a Bayer pattern filter. In another embodiment, image sensor 8 can be provided by monochrome MT9V022 image sensor.

In the course of operation of terminal 1000 image signals can be read out of image sensor circuit 1032, amplified by amplifier circuit 1036, converted by analog to digital converter 1037, and stored into a system memory such as RAM 1080. A memory 1085 of terminal 1000 can include RAM 1080, a nonvolatile memory 1082 such as may be provided by EPROM and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor pixel array 10 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor circuit 1032 and RAM 1080 are within the scope and the spirit of the invention.

Referring to further aspects of terminal 1000, lens assembly 100 can be adapted for use in focusing an image of a decodable indicia 15 located within a field of view 1240 on a substrate 1250 onto image sensor pixel array 10. Imaging light rays can be transmitted about imaging axis 25. Lens assembly 100 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 15 in such manner that aiming pattern 1270 is projected on a decodable indicia 15. In the example of FIG. 3, decodable indicia 15 is provided by a 1D bar code symbol. Decodable indicia 15 could also be provided by a 2D bar code symbols or optical character recognition (OCR) characters.

Each of illumination pattern light source bank 1204 and aiming pattern light source bank 1208 can include one or more light sources. Lens assembly 100 can be controlled with use of lens assembly control unit 1120. Illumination pattern light source bank 1204 can be controlled with use of illumination pattern light source control circuit 1220. Aiming pattern light source bank 1208 can be controlled with use of aiming pattern light source bank control circuit 1222. Lens assembly control unit 1120 can output signals for control of lens assembly 100, e.g., for changing a focal length and/or a best focus distance of (a plane of optical focus of) lens assembly 100. Illumination pattern light source bank control circuit 1220 outputs signals for control of illumination pattern light source bank 1204, e.g., for changing a level of illumination output by illumination pattern light source bank 1204. Aiming pattern light source bank control circuit 1222 can output signals to aiming pattern light source bank 1208, e.g., for changing a level of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that actuation of trigger 3408 activates a trigger signal and initiates a read attempt. Specifically, terminal 1000 can be operative so that in response to activation of a trigger signal, a succession of frames can be captured by way of read out of image information from image sensor pixel array 10 and then storage of the image information after conversion into memory 1080 (which can buffer one or more of the succession of frames at a given time). CPU 1060 can be operative to subject one or more of the succession of frames to a read (decode) attempt. For attempting to read a bar code symbol, CPU 1060 can process image data of a frame corresponding to a line of pixel positions (e.g., a column of pixel positions, a row of pixel positions, or a diagonal line of pixel positions) to determine a spatial pattern of dark and light cells and can convert each light and dark cell pattern determined into a character or character string via table lookup, to determine and output a message. By being operative to process a frame of image data for attempting to decode a decodable indicia, terminal 1000 can be regarded as including indicia decode operating mode. Operating with an indicia decode operating mode active, terminal 1000 can be operative to process a frame of image data for decoding the frame, and can further be operative for outputting a decoded message.

Terminal 1000 can include various interface circuits for coupling various of the peripheral devices to system address/data bus (system bus) 1500 for communication with CPU 1060, also coupled to system bus 1500. Terminal 1000 can include interface circuit 1028 for coupling image sensor timing and control circuit 1038 to system bus 1500, interface circuit 1118 for coupling lens assembly control unit 1120 to system bus 1500, interface circuit 1218 for coupling light source bank control circuit 1220 to system bus 1500, interface circuit 1224 for coupling aiming light source bank 1208 to system bus 1500, and interface circuit 3406 for coupling trigger 3408 to system bus 1500. Terminal 1000 can also include a display 3420 coupled to system bus 1500 and in communication with CPU 1060, via interface 3418, as well as pointer mechanism 3416 in communication with CPU 1060 via interface 3414 connected to system bus 1500.

A succession of frames of image data that can be captured and subject to the described processing can be full frames (including pixel values corresponding to each pixel over a predetermined area of image sensor pixel array). A succession of frames of image data that can be captured and subject to the described processing (e.g., frame quality evaluation processing) can also be "windowed frames" comprising pixel values corresponding to less than each pixel over a predetermined area of image sensor pixel array 10 and in some cases less than about 50% and in some cases less than 10% of pixels of image sensor pixel array 10. A succession of frames of image data that can be captured and subject to the described processing can also comprise a combination of full frames and windowed frames. A full frame can be captured by selectively addressing for readout of pixels of image sensor pixel array 10 corresponding to the full frame. A windowed frame can be captured by selectively addressing for readout of pixels of image sensor pixel array 10 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Terminal 1000 as is illustrated in the view of FIG. 4 can include a hand held housing 1014 supporting and encapsulating image sensor 8, lens assembly 100 and the additional components of terminal 1000 designated to be within boundary 1014 of FIG. 3.

Image sensor 8 can be configured so that an output response curve of image sensor pixel array 10 includes a logarithmic response pattern. For configuring image sensor 8 so that an output response curve includes a logarithmic pattern, image sensor 8 can include appropriate processing circuitry and control circuitry so that image sensor pixel array 10 includes a logarithmic response pattern. A frame of image data output from image sensor pixel array 10 by readout of a frame from image sensor pixel array 10 will have output signal levels corresponding to pixels of image sensor pixel array 10 that are in accordance with an active output response curve of image sensor 8; that is, will have output levels that vary with respect to light incident on image sensor pixel array 10 in a manner set forth by an output response curve that is active for image sensor 8. Image sensor 8 can be provided by a single state image sensor having a single signal output response curve that is always active or can be provided by a multiple state image sensor having a plurality of different output response curves, each being selectively active.

In one embodiment, an image sensor pixel array output response curve including a logarithmic response pattern has characteristics as shown by output response curve 500 of FIG. 5. In the embodiment of FIG. 5, the output response curve for image sensor pixel array 10 has a pair of linear response regions; namely, region 502 and region 504, where region 504 has a smaller slope than region 502. The piecewise linear regions 502 and 504 together define a logarithmic response pattern.

In another embodiment, an image sensor pixel array output response curve including a logarithmic response pattern has characteristics as shown by output response curve 510 of FIG. 6. In the embodiment of FIG. 6, a response curve for image sensor pixel array 10 has three linear regions 512, 514, and 516, the linear regions together defining a logarithmic response pattern.

Figure 7:
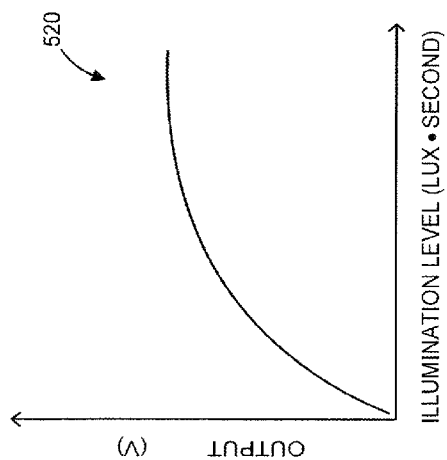

In another embodiment, an image sensor pixel array output response curve including a logarithmic response pattern has characteristics as shown by output response curve 520 of FIG. 7. In the embodiment described with reference to FIG. 7, the response curve is curvilinear logarithmic as opposed to being piecewise linear to define a logarithmic pattern as described in connection with the embodiments of FIGS. 5 and 6.

Figure 8:
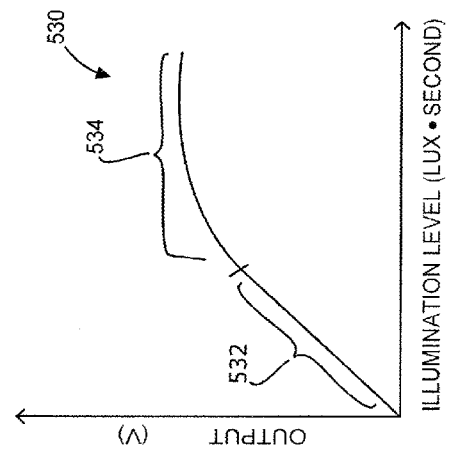

In another embodiment, an image sensor pixel array output response curve including a logarithmic response pattern has characteristics as shown by output response curve 530 of FIG. 8. In the embodiment described with reference to FIG. 8, the output response curve has a linear region 532, and a curvilinear logarithmic region 534.

Figure 9:
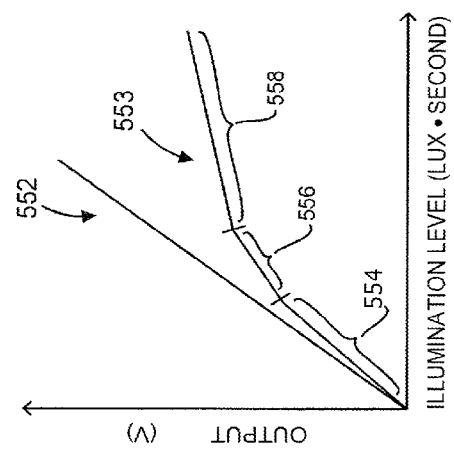

In another embodiment, an image sensor pixel output response curve including logarithmic response pattern has characteristics as shown by output response curve 552 and 553 of FIG. 9. In the embodiment described with reference to FIG. 9, image sensor 8 can be provided by a multiple state image sensor having output characteristics that can be varied in response to an applied input signal. In the embodiment of image sensor 8 described with reference to FIG. 9, image sensor 8 has a first linear response state and a second logarithmic response state. When the linear response state is active, an output response curve for the image sensor pixel array of the image sensor that is active can be as shown by curve 552 and defines a substantially straight linear pattern extending a range of possible illumination levels to an illumination level resulting in saturation of image sensor pixel array 10. When in the logarithmic response state, an output response curve 553 for the image sensor pixel array 10 that is active can be in accordance with piecewise linear segments 554, 556, 568 which together define a logarithmic pattern. A logarithmic pattern for the output response curve 553 when in the logarithmic response state can alternatively have one or more of the characteristics including a logarithmic pattern as described in connection with curves 500, 510, 520, and 530. Image sensor 8 can be configured so that the linear response output state can be made active by application of a linear response state signal to image sensor 8. Image sensor 8 can also be configured so that the logarithmic response state can be made active by application of a logarithmic response state signal to image sensor 8. CPU 1060 can be operative to initiate such signals via addressing of interface circuit 1028.

Where terminal 1000 includes a multiple state image sensor having a linear response state and a logarithmic output state, terminal 1000 can be operative so that terminal 1000 activates a selected one of the linear output states and logarithmic output states of image sensor pixel array 10 responsively to one or more of (a) a sensed condition and (b) a command initiated by an operator.

In one embodiment illustrating (a), terminal 1000 can be operative so that terminal 1000 activates the logarithmic output state of image sensor 8 and deactivates a linear response state of image sensor 8 responsively to a sensed ambient illumination level. Terminal 1000 can be operative to sense an ambient illumination level by processing of a frame of image data, e.g., by calculating a white level of a frame. A white level of a frame can be determined, e.g., by sampling pixel values of spaced apart pixel positions of a frame and then averaging the values. Terminal 1000 can be operative to activate a logarithmic output state of terminal 1000 in response to a determined ambient illumination level, as determined by processing of a frame of image data captured with use of image sensor pixel array 10 to determine whether a white level of the frame being processed exceeds a threshold e.g., a predetermined threshold or a dynamic threshold. Terminal 1000 can be operative so that saturated pixels of image sensor pixel array 10 are read out as having maximum signal levels (which can be converted into the digital pixel value p=255 in an 8-bit gray scale format). Accordingly, terminal 1000 can be operative to determine that a white level has been exceeded in the case a high percentage of pixels of image sensor pixel array 10 have saturated. Terminal 1000 can also be operative to determine an ambient illumination level of terminal 1000 by reading an output of a light level detector 1232 of terminal 1000 external to image sensor 8. It was determined that where an ambient light level of terminal 1000 is significantly low, activation of logarithmic response state of image sensor 8 may not prevent a significant number of pixels moving into saturation, and hence may not significantly increase image quality either for decoding applications or picture taking applications.

In an illustrative embodiment of (b) above, terminal 1000 can be operative so that terminal 1000 deactivates a linear response operating state and activates a logarithmic response state of image sensor 8 responsively to an operator selection of a picture taking mode, and conversely, terminal 1000 can be operative to activate a linear output state and to deactivate a logarithmic operating state of image sensor 8 responsively to an operator selection of an indicia decode mode.

In a picture taking mode, it was determined that a presence of pixel values corresponding to underexposed color pixels may negatively impact a frame of image data processed for output for visual display. Accordingly, it was determined that selectively operating the logarithmic response state selectively during operation of the terminal in an picture taking mode may benefit a visual quality of a processed frame for output. Activating a logarithmic response state can be expected to increase a signal level of pixel values, corresponding color pixel positions, and hence can be expected to improve visual quality of a frame of image data output for visual display.

In an indicia decode mode, pixel values corresponding to color pixel positions of image sensor pixel array 10 need not be processed for decoding of a decodable indicia. In one embodiment, terminal 1000 in an indicia decode mode can interpolate pixel values at pixel positions corresponding to color pixels utilizing pixel values of monochrome pixel positions and need not utilize pixel values at color pixel positions. Accordingly, it was determined that in an indicia decode mode, a frame quality may not be impacted by a presence of pixel values corresponding to underexposed color pixels in the manner of a frame processed in a picture taking mode for visual display. It was determined that for some applications, maintaining an output state of image sensor 8 in a linear response state when terminal 1000 operates in an indicia decode mode can positively impact decoding speed. For example, in one embodiment, with a linear output state active, different patterns having different levels of reflectivity are represented with greater resolution. Such improved resolution can be useful for purposes of increasing speed and accuracy of detecting edges in a decodable indicia representation.

In a further aspect, terminal 1000 can have a plurality of operator activated operating modes.

In one embodiment, terminal 1000 can have a first operator activated picture taking mode and a second operator activated indicia decode mode. Terminal 1000 can be operative so that image capture and processing can be activated responsively to an operator actuation of trigger 3408 irrespective of whether a picture taking mode or an indicia decode mode is active. However, terminal 1000 can be operative so that an output state (linear or logarithmic) of image sensor 8 is differentiated depending on which of a first picture taking mode or a second indicia decode mode is active.

In one embodiment, terminal 1000 can be operative so that an indicia decode mode can be activated by selection of displayed button 3444 displayed on display 3420 of terminal 1000. Terminal 1000 can be operative so that button 3444 can be selected with use of pointer mechanism 3410 of terminal 1000. Terminal 1000 can also be operative so that a picture taking mode is activated by selection of displayed button 3442 displayed on display 3420 of terminal 1000 as shown in FIG. 4. Terminal 1000 can be operative so that button 3442 can be selected with use of pointer mechanism 3410 Terminal 1000 can also be operative so that image capturing and processing can be activated by actuation of trigger 3408 irrespective of whether a picture taking mode or indicia decode mode is activated.

Figure 10:
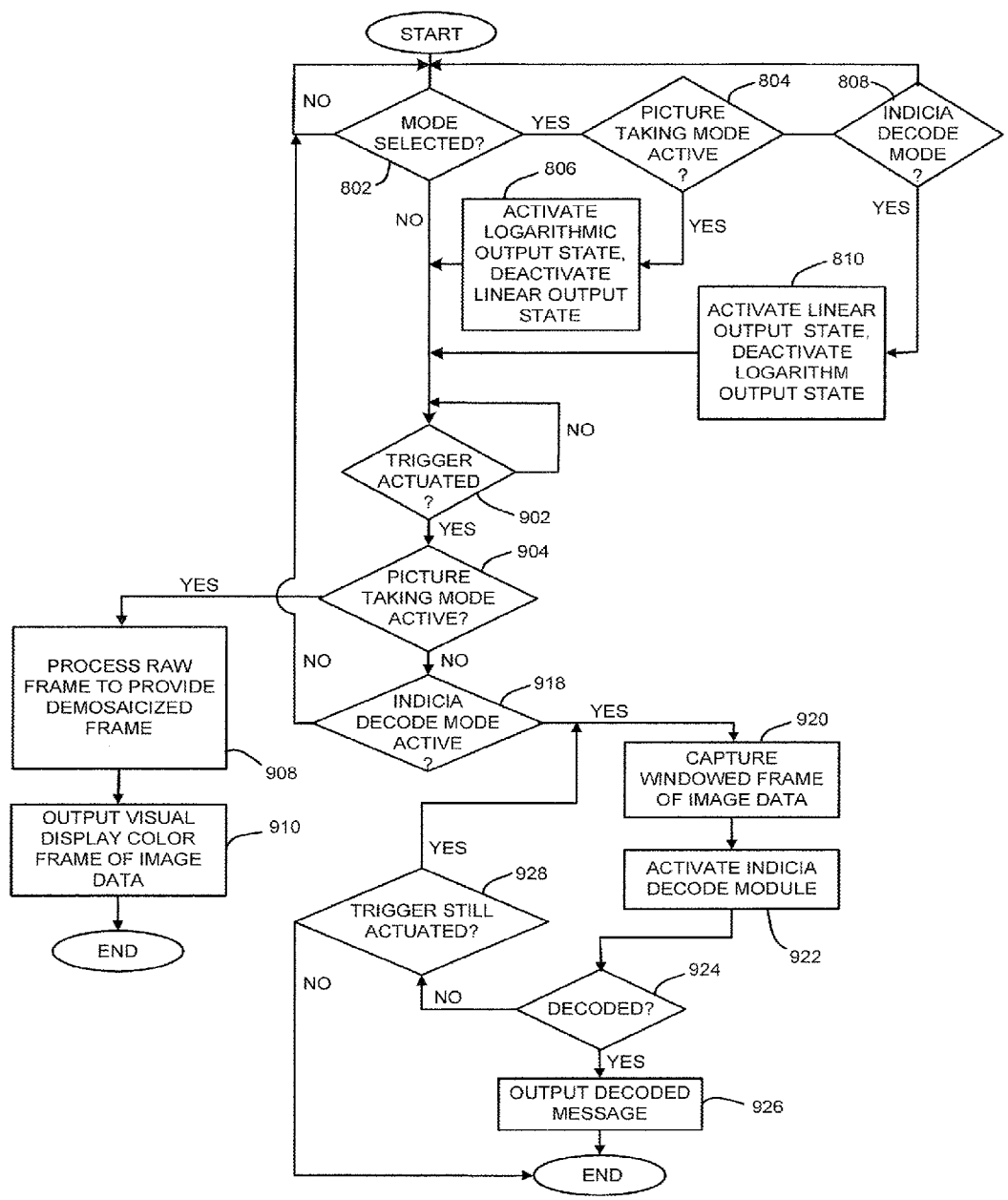
FIG. 10 is a flow diagram of an image sensor based terminal having a picture taking mode of operation and an indicia decode mode of operation.

Terminal 1000 can be operative according to the flow diagram of FIG. 10 so that a processing of image data is differentiated depending on which of an indicia decode mode or picture taking mode is active. Terminal 1000 can be operative so that if an indicia decode mode is activated (block 802 and block 808), terminal 1000 activates a linear output state of image sensor 8 (block 810) and deactivates a linear output state of image sensor 8. Terminal 1000 can be operative so that if a picture taking mode is activated (block 802 and block 804), terminal 1000 activates a logarithmic output state of image sensor 8 (block 806) and deactivates a linear output state of image sensor. In one embodiment, terminal 1000 is operative to restrict a manner in which an output state of image sensor 8 is changed so that an output state of image state is restricted from being changed except as described with reference to block 806 and block 810.

Terminal 1000 can be operative so that if trigger 3408 is actuated at block 902 with picture taking mode active (block 904), terminal 1000 proceeds to block 908 to process a raw frame of image data including pixel values at respective monochrome, red, green, and blue pixel positions so that terminal 1000 provides a demosaicized frame. Where image sensor pixel array 10 includes a Bayer pattern filter and no monochrome pixels, a raw frame of image data processed at block 908 can be expected to be devoid of monochrome pixel values. Block 908 can be avoided where image sensor pixel array 10 is a monochrome image sensor pixel array and where a raw frame subject to processing is devoid of color image data. For providing a demosaicized frame, terminal 1000 can determine a plurality of color scale values (e.g., red, green, and blue) for each of a plurality of pixel positions. Further, when a picture taking mode has been made active, terminal 1000 can proceed to block 910 to output a frame of image data for visual display. Terminal 1000 can output a visual display frame of image data, e.g., by writing a visual display frame to a display 3420 and/or an onboard memory 1082, 1084, and/or to an external terminal for display or storage. By having suitable hardware and/or software code facilitating operation of terminal 1000 in a described picture taking mode, terminal 1000 can be regarded as having a picture taking module 40.

If trigger 3408 is actuated (block 902) with indicia decode mode active (block 918) terminal 1000 can proceed to block 920 to capture a frame of image data. In one embodiment of processing in accordance with block 920, monochrome pixels of array 10 where provided by a hybrid monochrome and color image sensor pixel array can be selectively addressed to the exclusion of color pixels C of the image sensor array. In another embodiment, each pixel of image sensor pixel array 10 can be addressed for read out. Terminal 1000 can then proceed to block 922 to activate indicia decode module 30 to attempt to determine a decoded message that has been encoded with a decodable indicia represented in the image data. Where a frame that has been captured has been captured using a Bayer pattern image sensor pixel array 10, red and blue pixel values can be discarded and processing for attempting to decode can proceed with use of green pixel values only. If terminal 1000 has successfully decoded a message, terminal 1000 can output the message at block 926, e.g., by writing the decoded message to memory 1082, 1084, and/or an onboard display 3420, and/or an external terminal for storage or display. If a message is not successfully decoded (block 924) or if trigger 3408 remains activated (block 928), terminal 1000 can continue to capture (block 920) frames of image data and subject the image data captured to decode attempts (block 922) until a message is decoded or a trigger 3408 is deactivated (e.g., released). By having suitable hardware and/or software code facilitating operation of terminal 1000 in a described indicia decode mode, terminal 1000 can be regarded as having an indicia decode module 30.

In another embodiment illustrating (b) above, terminal 1000 is operative so that an output state of image sensor 8 is determined entirely by an operator selection of an output state of image sensor 8. As shown by FIG. 4, terminal 1000 can be operative so that selection of button 3446 (logarithmic output state) or button 3448 (linear output state) determines an output state of image sensor 8 irrespective of any sensed condition or other user input command. In such an embodiment, actuation of button 3446 can be regarded as activating a logarithmic output state override mode, and actuation of button 3448 can be regarded as activating a linear output state operating mode.

In one aspect, terminal 1000 can be operative so that when operating in an operating mode of terminal 1000, terminal outputs for storage and processing a subset of frames (e.g., one or more frames) with linear output state of image sensor pixel array 10 active and a subset of frames with logarithmic output state of image sensor pixel array 10 active. Such functionality can be realized by configuring terminal 1000 so that terminal 1000 is operative to switch an output state of image sensor 8 responsively to a sensed condition as described herein. For example, terminal 1000 can be operating in an indicia decode mode or picture taking mode with the linear output state of image sensor pixel array 10 active and then can switch an output state of image sensor 8 to a logarithmic output state while operating in the mode responsively to a sensed condition (e.g., a white level exceeding a threshold). Such switching of an output state can occur while a trigger signal that has been activated by an operator remains active.

Figure 11:
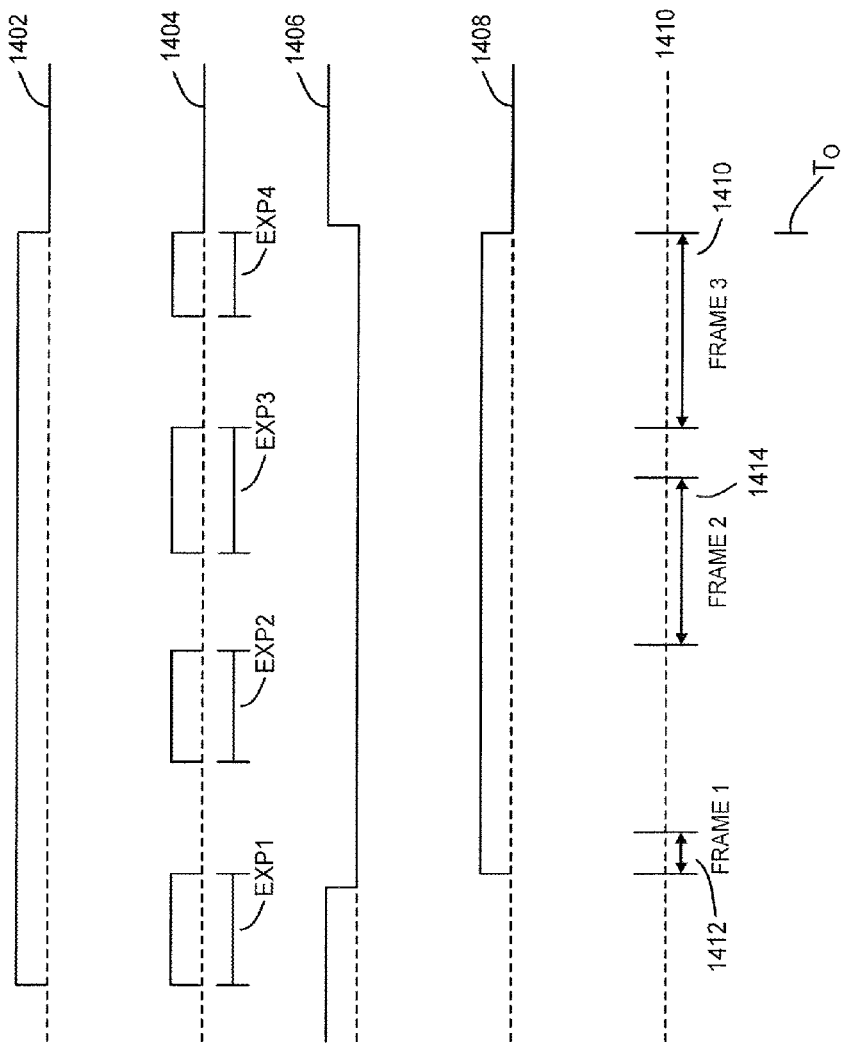
FIG. 11 is a timing diagram illustrating operation of an image sensor based terminal in one embodiment.

Another example of terminal 1000 operating in an operating mode in which terminal 1000 outputs for storage and processing a subset of frames with a linear output state active and a subset of frames with a logarithmic output state active is described with reference to the timing diagram of FIG. 11. Reference to the timing diagram of FIG. 11, signal 1402 can represent a trigger signal which may be activated by actuation of trigger 3408 and which can remain active until the earlier of a trigger 3408 being released or a time out condition being satisfied, e.g., a message being successfully decoded (decode mode) or a frame being output (picture taking mode). Referring to exposure control signal 1404, exposure control signal 1404 can have a plurality of exposure control pulses, EXP1, EXP2, EXP3, EXP4 representing exposure periods of image sensor pixel array 10. With further reference to the timing diagram of FIG. 11, signal 1406 can represent a logarithmic output state control signal of image sensor 8 and signal 1408 can represent a linear output state control of image sensor 8. Referring to plot 1408, plot 1408 indicates processing periods 1412, 1414, 1416 for terminal 1000 indicating processing periods of an element of terminal 1000 (e.g., CPU 1060). Processing period 1412 can indicate a period during which CPU 1060 processes a first frame exposed during exposure period EXP1, processing period 1414 can indicate a period during which CPU 1060 processes a second frame exposed during exposure period EXP2, and processing period 1416 can indicate a period during which CPU 1060 processes a third frame exposed during exposure period EXP3.

In the embodiment described with reference to FIG. 11, an output state of image sensor 8 can be maintained in a logarithmic output state for exposure of a first one or more frames after trigger signal 1402 is activated (one frame in the particularly described example), and then terminal 1000 switches an output state of image sensor 8 to a linear output state as is indicated by the state change of signal 1408 in the timeline of FIG. 4. With the linear output state of image sensor 8 active, second and third frames are exposed during exposure periods, EXP2, EXP3. During processing periods 1412 and 1414, CPU 1060 can process frames of image data (Frame 2 and Frame 3). Such processing can include attempting to decode a message encoded in a decodable symbol representation when the terminal is operating in an indicia decodable mode, and can include processing frames for output of a visual display frame of image data if operating in a picture taking mode. Time $T_o$ can represent a time at which Frame 3 is successfully decoded or successfully outputting for visual display.

It was determined that operating image sensor 8 in a logarithmic output state can be advantageous for purposes of determining parameters of terminal 1000 (e.g., exposure period parameters, image sensor gain parameters, illumination output parameters). It was determined that where terminal 1000 incorporates an exposure control algorithm with a linear output response curve active and operates in very high ambient conditions, it may take several frame times for a frame to be output that is not saturated (e.g., even if exposure period is reduced in half each period, it may take several frame times to output a frame with a sufficiently small exposure period as to avoid saturation). It was determined that because an output frame output with a logarithmic output state active is less likely to be in saturation, it is more reliably processed for parameter determination. Further, as has been described herein, outputting a frame with a logarithmic output state of image sensor 8 active can be advantageous for certain applications, e.g., edges in a decodable symbol representation can, in some cases, be more readily detected. Accordingly, operating terminal 1000 to output a first subset of frames output after initiation of a trigger signal with a logarithmic output state active and then switching to a linear output state provides for fast parameter determination as well as high contrast resolution. In the example of the timing diagram of FIG. 11, the second frame exposed during exposure period EXP2 can be exposed and captured utilizing parameters determined by processing of the frame exposed during exposure period EXP1 (depending on selected hardware, there may also be a processing delay so that a parameter determined by processing a first frame is not available for use in exposure of a subsequent frame until a time for exposure and capture of a frame that is subsequent to a frame that succeeds the first frame).

In a still further embodiment, terminal 1000 can be operative so that a logarithmic output state of image sensor 8 is maintained active by terminal 1000 throughout operation in an indicia decode mode and throughout operation in a picture taking mode (e.g., each frame output with trigger signal 1402 active in a decode mode or picture taking mode active can be output with the logarithmic output state of image sensor 8 active).

A small sample of systems methods and apparatus that are described herein is as follows:

A1. An indicia reading terminal comprising:

an image sensor having a hybrid monochrome and color image sensor pixel array, the hybrid monochrome and color image sensor pixel array having a first subset of pixels and a second subset of pixels, the first subset of pixels being monochrome pixels devoid of color filter elements and a second subset of pixels being a color sensitive subset of pixels including color filter elements;

a lens assembly for use in focusing an image onto the image sensor pixel array; and a hand held housing, wherein the hybrid monochrome pixel array is disposed within the hand held housing;

wherein the image sensor pixel array is configured so that an output response curve for the image sensor pixel array includes an output response curve having a logarithmic pattern;

wherein the terminal is operative in an indicia decode mode in which the terminal, in response to an operator initiated command, captures a frame of image data and processes the frame of image data for attempting to decode a decodable indicia representation;

wherein the terminal is operative in a picture taking mode in which the terminal, in response to an operator initiated command, captures a frame of image data and processes the frame of image data for output of a color frame of image data;

wherein the terminal is further operative so that the output response curve having the logarithmic pattern is active during operation of the terminal in at least one of the indicia decode mode or the picture taking mode.

A2. The indicia reading terminal of claim A1, wherein the output for response curve is characterized by a plurality of linear response regions of different slope.

A3. The indicia reading terminal of claim A1, wherein the output response curve is characterized by a curvilinear logarithmic region.

A4. The indicia reading terminal of claim A1, wherein the output response curve is characterized by a linear response region and a curvilinear logarithmic response region.

A5. The indicia reading terminal of claim A1, wherein the image sensor is a multiple state image sensor having a logarithmic output state and a linear output state, wherein the output response curve of the image sensor having the logarithmic pattern is active when the logarithmic output state is active, the image sensor being operative so that the image sensor has a linear output response curve when the linear output state is active.

A6. The indicia reading terminal of claim A1, wherein the image sensor is a single state image sensor configured so that the output response curve having the logarithmic response curve is always active.

B1. An image sensor based terminal comprising:

an image sensor having a hybrid monochrome and color image sensor pixel array, the hybrid monochrome and color image sensor pixel array having a first subset of pixels and a second subset of pixels, the first subset of pixels being monochrome pixels devoid of color filter elements and a second subset of pixels being a color sensitive subset of pixels including color filter elements;

a lens assembly for use in focusing an image onto the image sensor pixel array; and a hand held housing, wherein the image sensor based terminal is configured so that the hybrid monochrome and color image sensor pixel array is supported within the hand held housing;

wherein the image sensor a multiple state image sensor pixel array having a logarithmic output state in which an active output response curve for the image sensor pixel array includes a logarithmic pattern and a linear output state in which an active output response curve of the image sensor pixel array defines a substantially straight linear pattern extending a range of possible illumination levels to an illumination level resulting in saturation of the image sensor pixel array;

wherein the terminal is operative so that the terminal activates a selected one of the logarithmic output state and the linear output state responsively to one of a sensed condition or an operator input command.

B2. The image sensor based terminal of claim B1, wherein the terminal is operative to activate the logarithmic output state of the image sensor in response to a sensed ambient illumination level.

B3. The image sensor based terminal of claim B1, wherein the terminal is operative to activate the logarithmic output state of the image sensor in response to a sensed ambient illumination level, and wherein the terminal is operative to sense the ambient illumination level by processing of image data captured with use of the hybrid monochrome and color image sensor pixel array.

B4. The image sensor based terminal of claim B1, wherein the terminal is operative to activate the logarithmic output state of the image sensor in response to a sensed ambient illumination level, and wherein the terminal is operative to sense the ambient illumination level utilizing an output of a light level detector external to the hybrid monochrome and color image sensor pixel array.

B5. The image sensor based terminal of claim B1, wherein the terminal is operative to activate the logarithmic output state of the image sensor in response to an operator activating a picture taking mode.

B6. The image sensor based terminal of claim B1, wherein the terminal is operative to activate the linear output state of the image sensor in response to an operator activating an indicia decode mode.

B7. The image sensor based terminal of claim B1, wherein the terminal is operative to activate the logarithmic output state of the image sensor in response to an operator activating a logarithmic output state override mode.

B8. The image sensor based terminal of claim B1, wherein the terminal is operative to activate the linear output state of the image sensor in response to an operator activating a linear output state override mode.

C1. An image sensor based terminal comprising:
an image sensor having an image sensor pixel array, the image sensor pixel array having a plurality of pixels;
a lens assembly for use in focusing an image onto the image sensor pixel array; and
a hand held housing, wherein the image sensor based terminal is configured so that the image sensor pixel array is supported within the hand held housing;
wherein the image sensor is a multiple state image sensor pixel array having a logarithmic output state in which an active output response curve for the image sensor pixel array includes a logarithmic pattern and a linear output state in which an active output response curve of the image sensor pixel array defines a substantially straight linear pattern extending a range of possible illumination levels to an illumination level resulting in saturation of the image sensor pixel array;
wherein the terminal is operative in an operator initiated mode of operation in which there is output from the image sensor pixel array for processing a succession of frames having image information, the image sensor based terminal further being operative so that a first subset of the succession of frames are output from the image sensor pixel array with the logarithmic output state of the image sensor active, and further being operative so that a second subset of the succession of frames are output from the image sensor pixel array with the linear output state of the image sensor active.

C2. The image sensor based terminal of claim C1, wherein the terminal is operative so that the succession of frames are output responsively to an initiation of an operator initiated command.

C3. The image sensor based terminal of claim C2, wherein the operator initiated command is a command to initiate a trigger signal, and wherein the image sensor based terminal is operative to process the succession of frames for a time that the trigger signal remains active.

C4. The image sensor based terminal of claim C1, wherein the mode of operation is an indicia decode mode of operation.

C5. The image sensor based terminal of claim C1, wherein the mode of operation is a picture taking mode of operation.

C6. The image sensor based terminal of claim C1, wherein the image sensor pixel array is operative to output the first subset of frames prior to output of the second subset of frames.

C7. The image sensor based terminal of claim C1, wherein the image sensor pixel array is operative to output the first subset of frame prior to output of the second subset of frames, and wherein the terminal is operative to process a frame of the first subset of frames for parameter determination.

C8. The image sensor based terminal of claim C1, wherein the terminal is operative to output the first subset of frames prior to output of the second subset of frames, wherein the terminal is operative to process a frame of the first subset of frames for parameter determination, and wherein the terminal is operative to process a frame of the second subset of frames for attempting to decode decodable indicia.

C9. The image sensor based terminal of claim C1, wherein the terminal is operative to switch an output state of the image sensor during operation in the operating mode in response to a sensed condition.

C10. The image sensor based terminal of claim C1, wherein the image sensor pixel array includes color sensitive pixels.

C11. The image sensor based terminal of claim C1, wherein the image sensor pixel array is a hybrid monochrome and color pixel array having a first subset of pixels and a second subset of pixels, the first subset of pixels being monochrome pixels devoid of color filter elements, the second subset of pixels being color sensitive pixels having color filter elements.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

The invention claimed is:

1. An image sensor based terminal comprising:
an image sensor having an image sensor pixel array, the image sensor pixel array having a plurality of pixels;
a lens assembly for use in focusing an image onto the image sensor pixel array; and
a housing, wherein the image sensor based terminal is configured so that the image sensor pixel array is supported within the housing;
wherein the image sensor is a multiple state image sensor pixel array having a logarithmic output state in which an active output response curve for the image sensor pixel array includes a logarithmic pattern and a linear output state in which an active output response curve of the image sensor pixel array defines a substantially straight linear pattern extending a range of possible illumination levels to an illumination level resulting in saturation of the image sensor pixel array;
wherein the terminal has an operator initiated mode of operation in which there is output from the image sensor pixel array for processing a succession of frames having image information;
wherein the terminal is operative to:
in the operator initiated mode, output a first subset of the succession of frames from the image sensor pixel array with the logarithmic output state of the image sensor active; and
in the operator initiated mode, output a second subset of the succession of frames from the image sensor pixel array with the linear output state of the image sensor active;
output the first subset of frames prior to output of the second subset of frames;
process a frame of the first subset of frames for parameter determination; and
process a frame of the second subset of frames to attempt to decode decodable indicia.

2. The image sensor based terminal of claim 1, wherein the terminal is operative to activate the logarithmic output state of the image sensor in response to a sensed ambient illumination level.

3. The image sensor based terminal of claim 1, wherein the terminal is operative to:
   activate the logarithmic output state of the image sensor in response to a sensed ambient illumination level; and
   sense the ambient illumination level by processing image data captured with use of the hybrid monochrome and color image sensor pixel array.

4. The image sensor based terminal of claim 1, wherein the terminal is operative to activate the logarithmic output state of the image sensor in response to an operator activating a picture taking mode.

5. The image sensor based terminal of claim 4, wherein the image sensor based terminal is operative so that the logarithmic output state of the image sensor pixel array remains active for a duration of time that the picture taking mode remains active.

6. An image sensor based terminal comprising:
   an image sensor having an image sensor pixel array, the image sensor pixel array having a plurality of pixels;
   a lens assembly for use in focusing an image onto the image sensor pixel array; and
   a housing, wherein the image sensor based terminal is configured so that the image sensor pixel array is supported within the housing;
   wherein the image sensor is a multiple state image sensor pixel array having a logarithmic output state in which an active output response curve for the image sensor pixel array includes a logarithmic pattern and a linear output state in which an active output response curve of the image sensor pixel array defines a substantially straight linear pattern extending a range of possible illumination levels to an illumination level resulting in saturation of the image sensor pixel array;
   wherein the terminal has an operator initiated mode of operation in which there is output from the image sensor pixel array for processing a succession of frames having image information;
   wherein the terminal is operative to:
      in the operator initiated mode, output a first subset of the succession of frames from the image sensor pixel array with the logarithmic output state of the image sensor active; and
      in the operator initiated mode, output a second subset of the succession of frames from the image sensor pixel array with the linear output state of the image sensor active;
      process a frame of the first subset of frames for parameter determination; and
      process a frame of the second subset of frames to attempt to decode decodable indicia.

7. The image sensor based terminal of claim 6, wherein the terminal is operative to activate the logarithmic output state of the image sensor in response to a sensed ambient illumination level.

8. The image sensor based terminal of claim 6, wherein the terminal is operative to:
   activate the logarithmic output state of the image sensor in response to a sensed ambient illumination level; and
   sense the ambient illumination level by processing image data captured with use of the hybrid monochrome and color image sensor pixel array.

9. The image sensor based terminal of claim 6, wherein the terminal is operative to:
   activate the logarithmic output state of the image sensor in response to a sensed ambient illumination level;
   sense the ambient illumination level utilizing an output of a light level detector external to the hybrid monochrome and color image sensor pixel array.

10. The image sensor based terminal of claim 6, wherein the terminal is operative to activate the logarithmic output state of the image sensor in response to an operator activating a picture taking mode.

* * * * *